(12) United States Patent  
Lai et al.

(10) Patent No.: US 8,658,293 B2  
(45) Date of Patent: Feb. 25, 2014

(54) MAGNETIC RECORDING MEDIA AND METHOD FOR MAKING THE SAME

(75) Inventors: Chih-Huang Lai, Hsinchu (TW); Hao-Cheng Hou, Hsinchu (TW); Chao-Chien Chiang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/492,978

(22) Filed: Jun. 11, 2012

(65) Prior Publication Data

US 2013/0084469 A1    Apr. 4, 2013

(30) Foreign Application Priority Data

Sep. 29, 2011 (TW) .............................. 100135265 A

(51) Int. Cl.  
*G11B 5/66* (2006.01)

(52) U.S. Cl.  
USPC ...................................................... 428/836.1

(58) Field of Classification Search  
None  
See application file for complete search history.

(56) References Cited

PUBLICATIONS

Yuan et al., J Magn Mag Matl, 272-276 (Dec. 2004) 1164-1166.*  
Tsai et al., J Appl Phys, 107, (May 2010), 113923-1-3.*  
Zha et al. "Continuously graded anisotropy in single (Fe53Pt47)100-xCux films", Applied Physics Letters, 97, Nov. 2010, p. 182504-1-3).*  
Lai et al. "Improvement of magnetic properties of FePt nanoparticles by adding Mn," Journal of Applied Physics, 97, p. 10J314-1-3, May 2005).*

* cited by examiner

*Primary Examiner* — Holly Rickman  
(74) *Attorney, Agent, or Firm* — Birch, Stewart, Kolasch & Birch, LLP

(57) ABSTRACT

A magnetic recording medium includes: a substrate, and a magnetic recording layer that is made from a material having the chemical formula of $Fe_xMn_yPt_z$, and that has a bottom surface and an upper surface; wherein x, y, and z indicate average atomic concentrations for Fe, Mn, and Pt, and x+y+z is 100, x and y being greater than 0 and not greater than 65, z being in the range from 35 to 60; and wherein atomic concentration of Fe is gradually decreased from the upper surface to the bottom surface, and atomic concentration of Mn is gradually increased from the upper surface to the bottom surface so that the ferromagnetic property of the magnetic recording layer is gradually reduced from the upper surface to the bottom surface.

3 Claims, 8 Drawing Sheets

MAGNETIC RECORDING MEDIA AND METHOD FOR MAKING THE SAME

CROSS-REFERENCE TO RELATED APPLICATION

This application claims priority of Taiwanese application no. 100135265, filed on Sep. 29, 2011.

BACKGROUND OF THE INVENTION

1. Field of the Invention

This invention relates to a magnetic recording medium, more particularly to a graded magnetic recording medium.

2. Description of the Related Art

In recent years, demand for data storage has continuously increased. To meet present requirements, not only must a grain size in high density recording media be reduced to increase the recording density, but a good isolation must also be provided to reduce noise interference between grains generated by intergranular coupling. In addition, a sufficient perpendicular magnetic anisotropic energy (Ku) is also required to provide a good thermal stability (KuV/kT). However, if the volume of the grain is too small, the product of the magnetic anisotropic energy and the volume (KuV) will be insufficient to overcome the thermal disturbance caused by external temperature, thereby resulting in an unstable magnetic moment known as superparamagnetism.

In a perpendicular type recording medium with a small recording bit size, since the direction of the magnetic moment is perpendicular to a layer surface direction of a magnetic recording layer, the stability thereof will not be adversely affected. Therefore, in the existing technologies, the perpendicular recording type is generally used to increase the magnetic anisotropic energy (Ku) so as to achieve an improved thermal stability.

In addition, the ferromagnetic property of a magnetic recording layer of a graded recording medium is increased gradually from an upper surface to a bottom surface thereof. That is, the ferromagnetic property is gradually changed from a soft magnetic property to a hard magnetic property from the upper surface to the bottom surface of the magnetic recording layer, so that the overall writing field can be reduced. Further, the magnetic recording layer of the graded recording medium may maintain the required thermal stability due to its hard magnetic property.

Jai-Lin Tsai et al. disclosed a method for making a graded Fe/FePt film ("Magnetic properties and microstructure of graded Fe/FePt films", *JOURNAL OF APPLIED PHYSICS* 107, 113923 (2010)). Referring to FIG. 1, the method comprises forming a $Fe_{56}Pt_{44}$ alloy layer 12 having a thickness of 10 nm on a glass substrate 11 by a DC magnetron sputtering process. Next, the glass substrate 11 formed with the $Fe_{56}Pt_{44}$ alloy layer 12 is subjected to a rapid thermal process (RTP) at 800° C. for 10 minutes to change the $Fe_{56}Pt_{44}$ alloy layer 12 into an ordered phase ($L1_0$ phase, a face-centered tetragonal (fct) structure) with a hard magnetic property. Thereafter, a Fe layer 13 having a thickness of 6 nm is sputtered on the $Fe_{56}Pt_{44}$ alloy layer 12, followed by subjecting the Fe layer 13 to the rapid thermal process at a temperature of 700° C. for 1 minute to allow interdiffusion between the Fe atoms of the Fe layer 13 and the Pt atoms of the $Fe_{56}Pt_{44}$ alloy layer 12, thereby changing the $Fe_{56}Pt_{44}$ alloy layer 12 and the Fe layer 13 into a graded Fe/FePt alloy film 14. Finally, a $SiO_2$ layer 15 is formed on the graded Fe/FePt alloy film 14.

The ferromagnetic property of the graded Fe/FePt alloy film 14 is gradually increased from an upper surface 141 to a bottom surface 142 thereof. However, the temperature required to form the FePt alloy of the $L1_0$ phase in the rapid thermal process is up to 700° C.~800° C. Therefore, the high process temperature is not suitable for applying to elements that have been incorporated into a semiconductor device.

C. L. Zha et al. disclosed a method for making a magnetic recording medium ("Continuously graded anisotropy in single $(Fe_{53}Pt_{47})_{100-x}Cu_x$ films", *APPLIED PHYSICS LETTERS* 97, 182504 (2010)). Referring to FIG. 2, the method comprises first forming a $SiO_2$ layer 22 having a thickness of 1 μm on a silicon (Si) substrate 21 by a thermal oxidation process. Next, a Ta layer 23 having a thickness of 6 nm and a Pt layer 24 having a thickness of 3 nm are formed in this order on the $SiO_2$ layer 22, followed by forming a $(Fe_{53}Pt_{47})_{100-x}Cu_x$ alloy film 25 having a thickness of 20 nm on the Pt layer 24 using a co-sputtering process. In the $(Fe_{53}Pt_{47})_{100-x}Cu_x$ alloy film 25, the Cu content is gradually decreased from a bottom surface 251 to an upper surface 252 thereof, so that the compositions of the bottom surface 251 and the upper surface 252 are $(Fe_{53}Pt_{47})_{70}Cu_{30}$ and $Fe_{53}Pt_{47}$ respectively. The gradient variation of the Cu content is achieved by controlling the output power of the Cu target in the co-sputtering process. Thereafter, the $(Fe_{53}Pt_{47})_{100-x}Cu_x$ alloy film 25 is subjected to an annealing process at a temperature of 500° C. for 35 minutes to change the $(Fe_{53}Pt_{47})_{100-x}Cu_x$ alloy film 25 into a graded magnetic recording film 26. Finally, a capping layer 27 that is made of a Ta material and that has a thickness of 5 nm is formed on the graded magnetic recording film 26 to prevent oxidation of the graded magnetic recording film 26.

C. L. Zha et al. utilizes the doping of Cu atoms to reduce the ordering temperature required to form the FePt alloy of the $L1_0$ phase. Thus, the graded magnetic recording film 26 has $L1_0$ phase adjacent to a bottom surface 261 thereof and the disordered phase (also referred to as A1 phase) adjacent to an upper surface 262 thereof, to form a face-centered cubic (fcc) structure. Therefore, the ferromagnetic property of the graded magnetic recording film 26 is gradually increased from the upper surface 262 to the bottom surface 261. In this way, the graded magnetic recording film 26 may maintain a process temperature at about 500° C. to meet the requirement of the manufacturing process of semiconductor devices. However, it is found that, through the analysis of X-ray diffraction (XRD), the graded magnetic recording film 26 has only (111) preferential orientation, and lacks (001) preferential orientation that is necessary for graded perpendicular recording media with high recording density. Thus, perpendicular magnetic anisotropy and thermal stability are somewhat adversely affected. Therefore, there is a need in the art to provide a magnetic recording medium that has an improved perpendicular magnetic anisotropy and thermal stability.

SUMMARY OF THE INVENTION

According to this invention, a magnetic recording medium comprises:
 a substrate; and
 a magnetic recording layer that is made from a material having the chemical formula of $Fe_xMn_yPt_z$, that is formed above the substrate, and that has a bottom surface adjacent to the substrate and an upper surface away from the substrate;
  wherein x, y, and z indicate average atomic concentrations for Fe, Mn, and Pt in the magnetic recording layer, and x+y+z is 100, x and y being greater than 0 and not greater than 65, z being in the range from 35 to 60;
  wherein atomic concentration of Fe is gradually decreased from the upper surface to the bottom surface, and atomic concentration of Mn is gradually increased from the upper surface to the bottom surface so that the ferromagnetic property of the magnetic recording layer is gradually reduced from the upper surface to the bottom surface.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
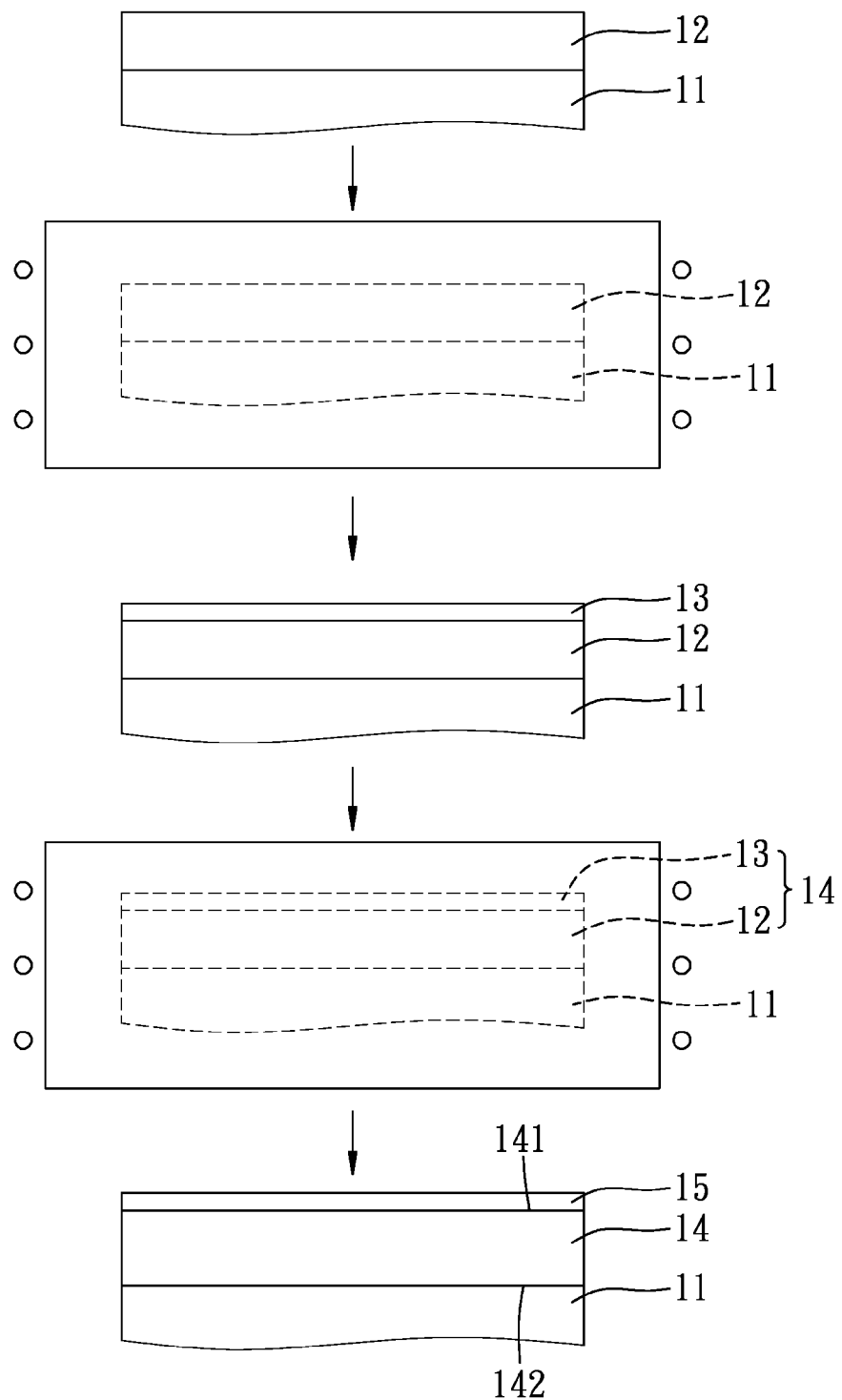
FIG. 1 illustrates consecutive steps of a conventional method for making a graded Fe/FePt film.
Figure 2:
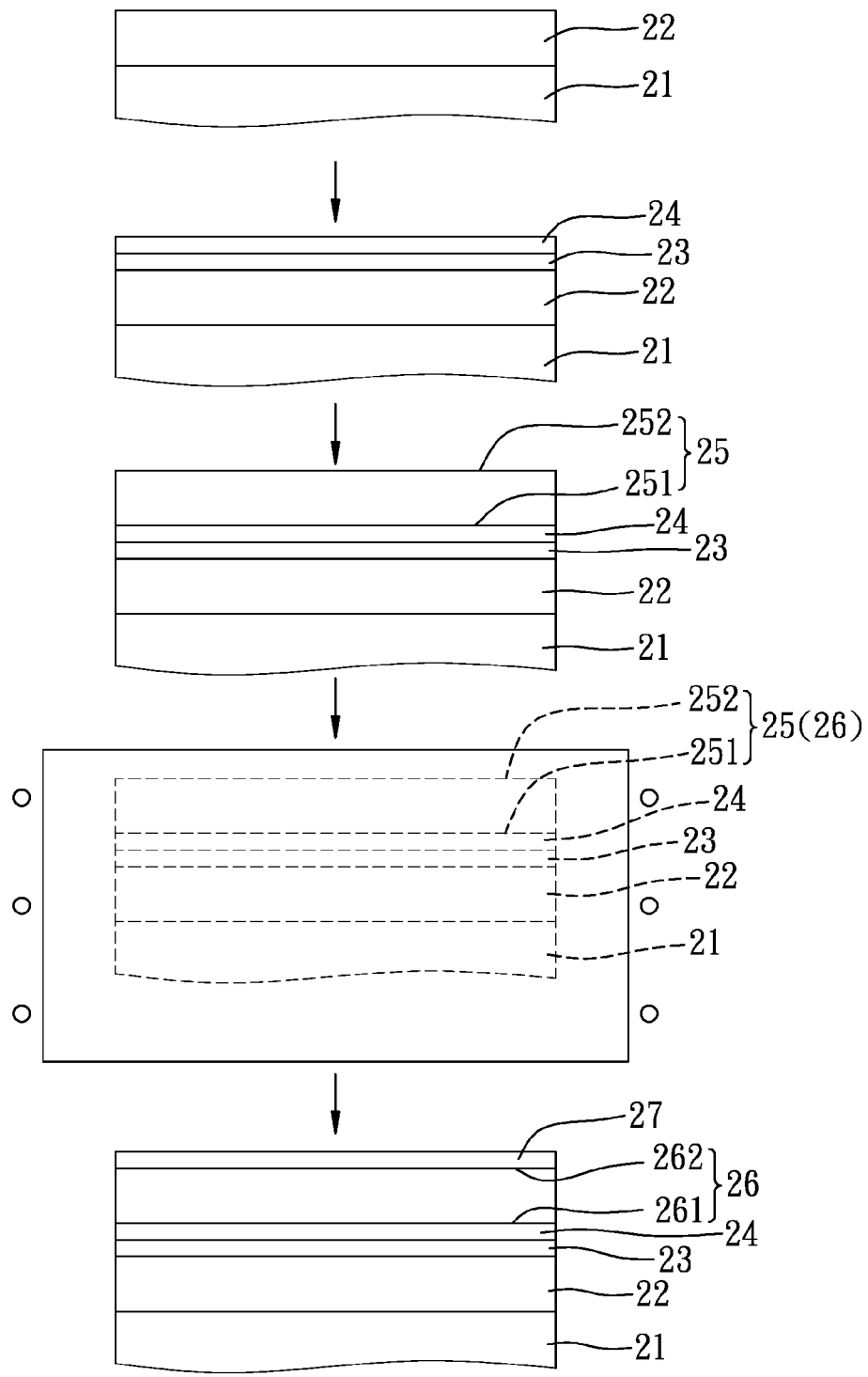
FIG. 2 illustrates consecutive steps of another conventional method for making a magnetic recording medium.
Figure 3:
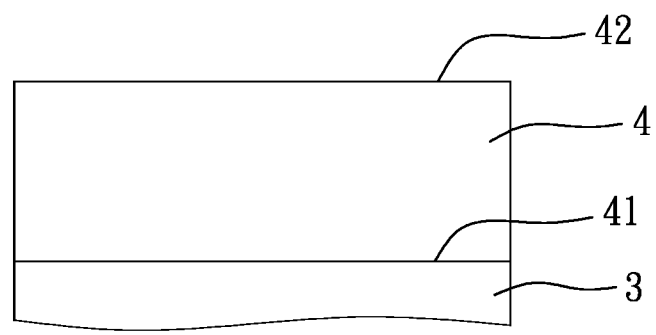
FIG. 3 is a schematic view of the preferred embodiment of a magnetic recording medium according to the present invention.

Referring to FIG. 3, the preferred embodiment of a magnetic recording medium according to the present invention is shown to include a substrate 3 and a magnetic recording layer 4 formed on the substrate 3. The magnetic recording layer 4 is made from a material having the chemical formula of $Fe_xMn_yPt_z$, and has a bottom surface 41 adjacent to the substrate 3 and an upper surface 42 away from the substrate 3. x, y, and z indicate average atomic concentrations for Fe, Mn, and Pt in the magnetic recording layer 4, and x+y+z is 100. x and y are greater than 0 and not greater than 65. z is in the range from 35 to 60. The atomic concentration of Fe is gradually decreased from the upper surface 42 to the bottom surface 41, and the atomic concentration of Mn is gradually increased from the upper surface 42 to the bottom surface 41 so that the ferromagnetic property of the magnetic recording layer 4 is gradually reduced from the upper surface 42 to the bottom surface 41. That is, the bottom surface 41 with higher Mn atomic concentration and the upper surface 42 with higher Fe atomic concentration have a soft magnetic property and a hard magnetic property, respectively.

Preferably, the substrate 3 is a MgO (001) substrate.

When the magnetic recording medium is in use, the magnetic field is read through a magnetic head located above the magnetic recording medium. Since the hard magnetic property is formed at the upper surface 42 of the magnetic recording layer 4, the hard magnetic property of the magnetic recording layer 4 is closer to the magnetic head than that of the graded Fe/FePt alloy films 14 disclosed by Jai-Lin Tsai et al and the graded magnetic recording film 26 disclosed by C. L. Zha et al, so that a more sensitive signal can be obtained.

In this embodiment, a FeMnPt tertiary alloy is formed by means of interdiffusion of Mn and Fe atoms. Through the anti-ferromagnetic exchanged coupling generated between the anti-ferromagnetic MnPt alloy and the ferromagnetic FePt alloy in the $Fe_xMn_yPt_z$ magnetic recording layer, an additional magnetic anisotropic property is induced, thereby promoting the out-of-plane coercivity of the FePt alloy and the thermal stability of the magnetic recording layer 4.

It should be appreciated by those of ordinary skill in the art that the atomic ratio of the Fe atom and the Pt atom in the $L1_0$ phase and A1 phase should be maintained at 1:1 to avoid damage to crystal structure. In addition, the Mn atoms of this embodiment may be formed into a MnPt alloy or a FeMnPt alloy with Fe atoms and Pt atoms. Further, the lattice constants of the FePt alloy with $L1_0$ phase and the MnPt alloy with $L1_0$ phase are very close, that is, the c/a ratios of the FePt alloy and the MnPt alloy are respectively 0.96 and 0.92, and the a-axis lattice constants of the FePt alloy and the MnPt alloy are respectively 0.387 and 0.40. Therefore, in this invention, the Mn atoms are used mainly to substitute the Fe atoms in the lattice sites in the $L1_0$ phase.

Preferably, x is in the range from 10 to 45, y is in the range from 10 to 45, z is in the range of 45 to 55, and the magnetic recording layer 4 has a face-centered-tetragonal (fct) structure (i.e., $L1_0$ phase).

Preferably, the face-centered-tetragonal (fct) structure of the magnetic recording layer 4 has (001) preferential orientation.

Figure 4:
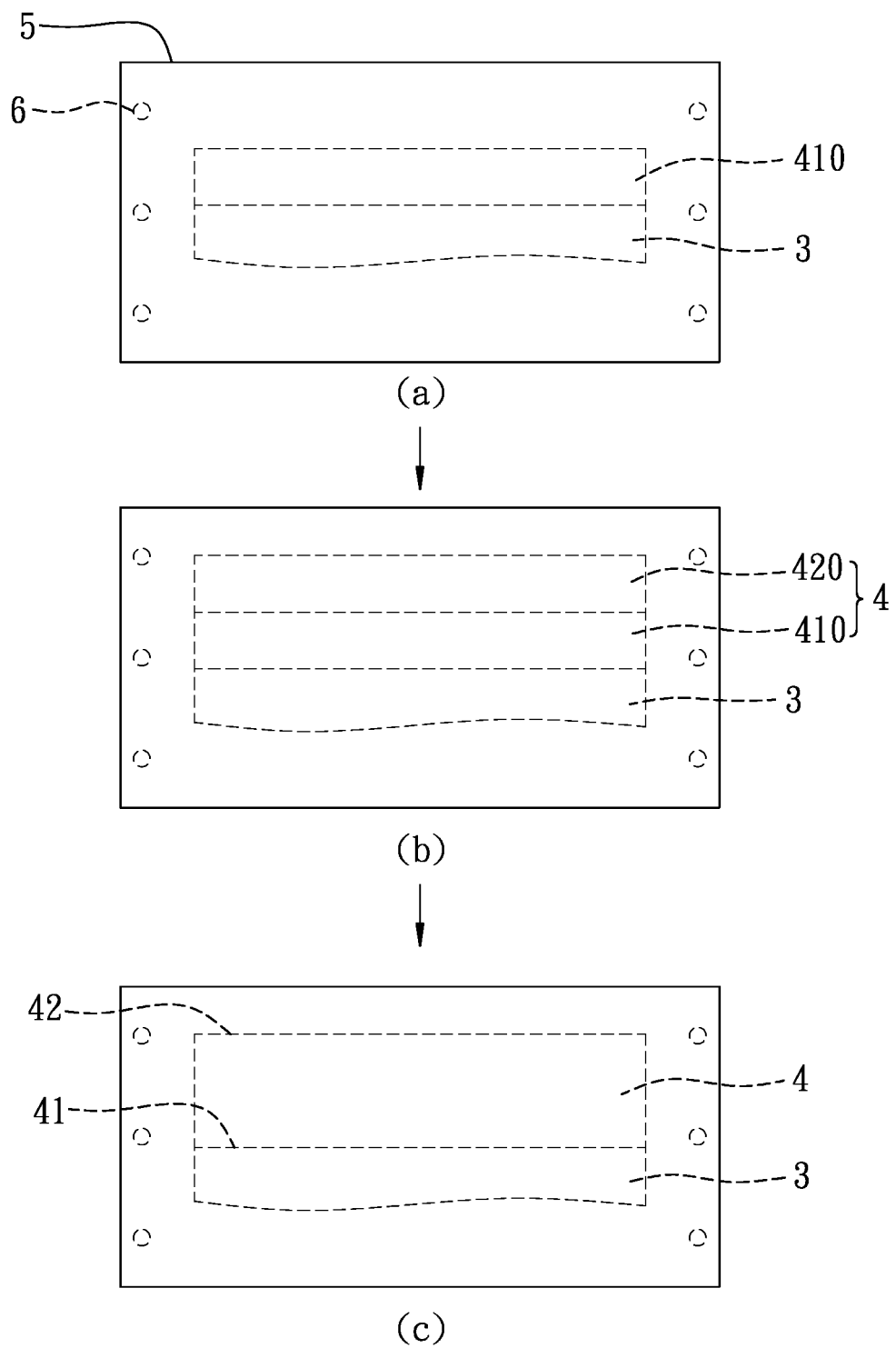
FIG. 4 illustrates steps of the preferred embodiment of a method for making the magnetic recording medium of the preferred embodiment according to the present invention.

Referring to FIG. 4, a method for making the magnetic recording medium of the preferred embodiment according the present invention comprises:

(a) forming on the substrate 3 a first magnetic layer 410 at annealing temperature, the first magnetic layer 410 being made from a material having the chemical formula of $Mn_pPt_{100-p}$, p being in the range from 40 to 65; and (b) forming on the first magnetic layer 410 a second magnetic layer 420 at annealing temperature, the second magnetic layer 420 being made from a material having the chemical formula of $Fe_qPt_{100-q}$, q being in the range from 40 to 65.

In step (b), Mn atoms in the first magnetic layer 410 and Fe atoms in the second magnetic layer 420 are interdiffused to form a magnetic recording layer 4 in which atomic concentrations of Fe and Mn are gradually changed from the upper surface 141 to the bottom surface 142.

Preferably, p is in the range from 45 to 55 and q is in the range from 45 to 55.

Preferably, the first magnetic layer 410 in step (a) has a thickness ranging from 5 nm to 50 nm, and the second magnetic layer 420 in step (b) has a thickness ranging from 5 nm to 50 nm.

Preferably, the annealing temperature is a temperature not less than 500° C.

One reason of using MnPt alloy as the first magnetic layer 410 is that the ordering temperature for the MnPt alloy is about 250° C. that is relatively lower than the ordering temperature (about 800° C.) for the $Fe_{56}Pt_{44}$ alloy layer 12 disclosed by Jai-Lin Tsai et al. Therefore, the ordering temperature for the magnetic recording layer 4 composed of $Fe_xMn_yPt_z$ can be reduced by virtue of the Mn atoms so that the method for making the magnetic recording medium of this invention can be advantageously incorporated into a semiconductor manufacturing process. In addition, another reason is that the MnPt alloy is grown on the MgO (001) substrate in a planar growth mechanism. The MnPt alloy having the planar growth pattern may provide an in-plane tensile stress during formation of the $L1_0$ phase of the FePt alloy above the MnPt alloy so that the FePt alloy may also present a planar growth pattern. Compared to the FePt alloy, when the FePt alloy is grown on the MgO (001) substrate, the growth pattern is an island type. Although the island type growth pattern facilitates the formation of the (001) preferential orientation of the $L1_0$ phase of the FePt alloy and further promotes the perpendicular anisotropy and the thermal stability, the (001) preferential orientation of the FePt alloy formed by the island type growth pattern may cause difficulty in write-in operation due to the excessively high switching field (Hs). Moreover, since the MgO (001) substrate not only can facilitate the formation of the (001) preferential orientation of a face-centered-tetragonal (FCT) structure of the magnetic recording layer 4 composed of $Fe_xMn_yPt_z$, but may also not have the problem of excessively high switching field, the substrate 3 is preferably a MgO (001) substrate, and the magnetic recording layer 4 has a FCT structure.

The magnetic recording layer 4 thus obtained can be further annealed at a temperature higher than the annealing temperature in steps (a) and (b), i.e., preferably not less than 550° C.

It is noted that the first magnetic layer 410 and the second magnetic layer 420 are formed by a co-sputtering process, and the annealing temperature in steps (a) and (b) is achieved using a halogen lamp 6 in a sputtering chamber 5. In the method of this embodiment, before sputtering the first magnetic layer 410 and the second magnetic layer 420, a thermocouple is placed on a base (not shown) that supports the substrate 3 in the sputtering chamber 5 to determine the temperature relationship between the halogen lamp 6 and the base. When the first magnetic layer 410 and the second magnetic layer 420 are sputtered, the thermocouple is removed from the sputtering chamber 5, and the annealing temperature is achieved by virtue of the halogen lamp 6.

EXAMPLES

Example 1 (E1)

A MnPt magnetic layer having a thickness of 50 nm and a FePt magnetic layer having a thickness of 12.5 nm were formed in this order on a MgO (001) substrate in a sputtering chamber by a co-sputtering process at an annealing temperature of 500° C. During formation of the FePt magnetic layer, the Mn atoms in the MnPt magnetic layer and the Fe atoms in the FePt magnetic layer interdiffused to form a FeMnPt magnetic recording layer. The atomic concentration of Mn gradually increased from an upper surface to a bottom surface of the FeMnPt magnetic recording layer. Next, the FeMnPt magnetic recording layer was further annealed at 550° C. for 30 minutes to obtain the magnetic recording medium of Example 1 (E1). It is found that, before the FePt magnetic layer is formed, the MnPt magnetic layer of Example 1 (E1) is a $Mn_{51}Pt_{49}$ alloy through the analysis of an inductively coupled plasma-mass spectrometer (ICP-MS). In Example 1 (E1), based on the thicknesses of the MnPt magnetic layer and the FePt magnetic layer and the calculation of the atomic percentage, the FeMnPt magnetic recording layer contains 10 at % of Fe, 41 at % of Mn, and 49 at % of Pt.

Example 2 (E2)

The manufacturing process of Example 2 (E2) of a magnetic recording medium of the present invention is generally the same as that of E1 except that, in E2, the thickness of the FePt magnetic layer was 25 nm, and the FeMnPt magnetic recording layer thus obtained contains 17 at % of Fe, 34 at % of Mn, and 49 at % of Pt.

Example 3 (E3)

The manufacturing process of Example 3 (E3) of a magnetic recording medium of the present invention is generally the same as that of E1 except that, in E3, the thickness of the FePt magnetic layer was 50 nm, and the FeMnPt magnetic recording layer contains 26 at % of Fe, 26.5 at % of Mn, and 48.5 at % of Pt.

Comparative Example 1 (CE1)

A FePt magnetic layer having a thickness of 12.5 nm was formed on a MgO (001) substrate in a sputtering chamber by a co-sputtering process at an annealing temperature of 500° C. Next, the FePt magnetic layer was annealed at a temperature of 550° C. for 30 minutes. It is found that the FePt magnetic layer is a $Fe_{52}Pt_{48}$ alloy determined through an ICP-MS.

Comparative Example 2 (CE2)

The manufacturing process of a comparative example 2 (CE2) of a magnetic recording medium is generally the same as that of CE1 except that, in CE2, the thickness of the FePt magnetic layer was 25 nm.

Comparative Example 3 (CE3)

The manufacturing process of a comparative example 3 (CE3) of a magnetic recording medium is generally the same as that of CE1 except that, in CE3, the thickness of the FePt magnetic layer was 50 nm.

<Analysis>

Figure 5:
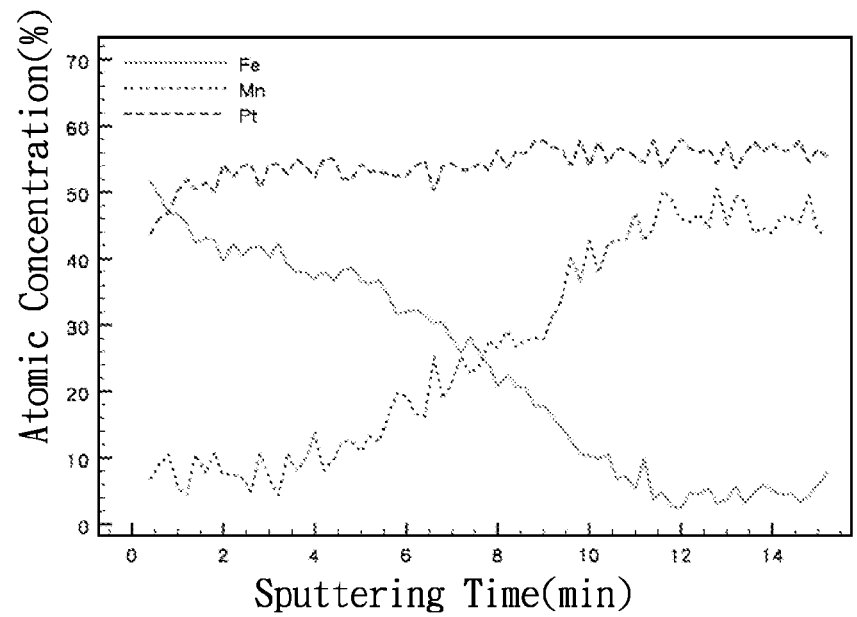
FIG. 5 is an Auger electron spectrometer (AES) depth profile graph of a magnetic recording layer of a magnetic recording medium of Example 2 (E2), illustrating atomic concentration change of Fe, Mn and Pt in the magnetic recording layer.

FIG. 5 illustrates the depth profile of the FeMnPt magnetic recording layer of E2, that was obtained using an Auger electron spectrometer (AES). As shown in FIG. 5, the Fe content and the Mn content in the magnetic recording layer of E2 are gradually decreased and increased from an upper surface and a bottom surface of the magnetic recording layer, respectively. The magnetic recording layer of E2 has approximately 52%, 6% and 44% of atomic concentrations of Fe, Mn and Pt, respectively, at the upper surface thereof, and has approximately 8%, 44% and 54% of atomic concentrations of Fe, Mn and Pt, respectively, at the bottom surface thereof.

Figure 6:
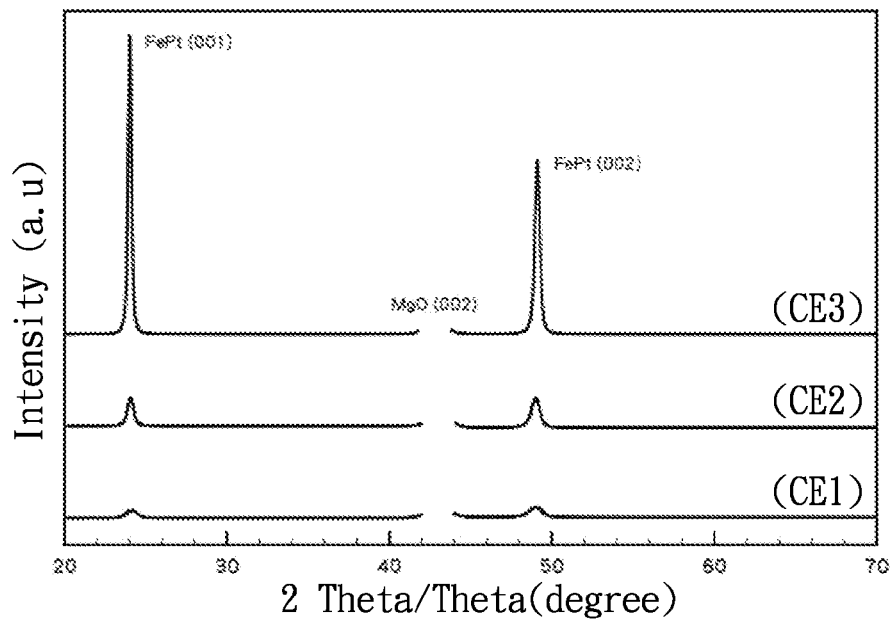
FIG. 6 is an X-ray diffraction (XRD) graph for a FePt magnetic layer of a magnetic recording medium in comparative examples 1 to 3 (CE1 to CE3)

It can be seen from FIG. 6 that CE1, CE2, and CE3 have two diffraction peaks of (001) plane and (002) plane of a FePt alloy at about 24 degrees and 49 degrees, respectively. This proves that the FePt magnetic layers of CE1 to CE3 have $L1_0$ phases.

Figure 7:
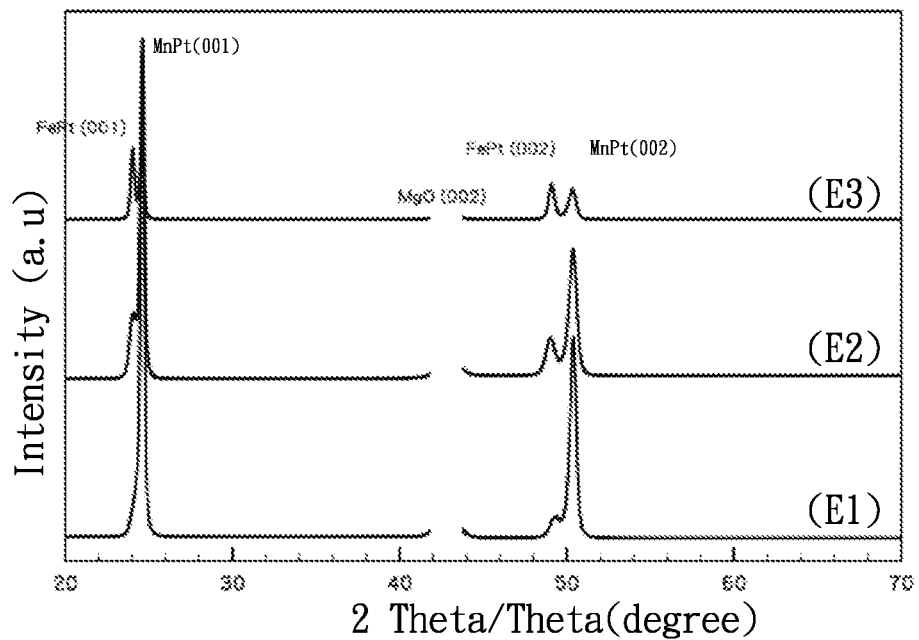
FIG. 7 is an X-ray diffraction graph for a FeMnPt magnetic recording layer of a magnetic recording medium of Examples 1 to 3 (E1 to E3)

It can be seen from FIG. 7 that the FeMnPt magnetic recording layer of E1 has a diffraction peak of the (002) plane of a FePt alloy at about 49 degrees, and two diffraction peaks of the (001) plane and the (002) plane of a MnPt alloy at about 24.6 degrees and 50.4 degrees, respectively. This proves that the FeMnPt alloy magnetic recording layer of E1 has $L1_0$ phase. It is noted that the (001) plane is parallel to the (002) plane, and the [001] direction and the [002] direction refer to the same direction. Therefore, it also proven that the $L1_0$ phase of E1 has (001) preferential orientation. The FeMnPt magnetic recording layers of E2 and E3 have two diffraction peaks of the (001) plane and the (002) plane of a FePt alloy at about 24 degrees and 49 degrees, respectively, and two diffraction peaks of the (001) plane and the (002) plane of a MnPt alloy at about 24.6 degrees and 50.4 degrees, respectively. This proves that the FeMnPt alloy magnetic recording layers of Examples 2 and 3 (E2 and E3) have $L1_0$ phases. In addition, the $L1_0$ phases have (001) preferential orientations.

Figure 8:
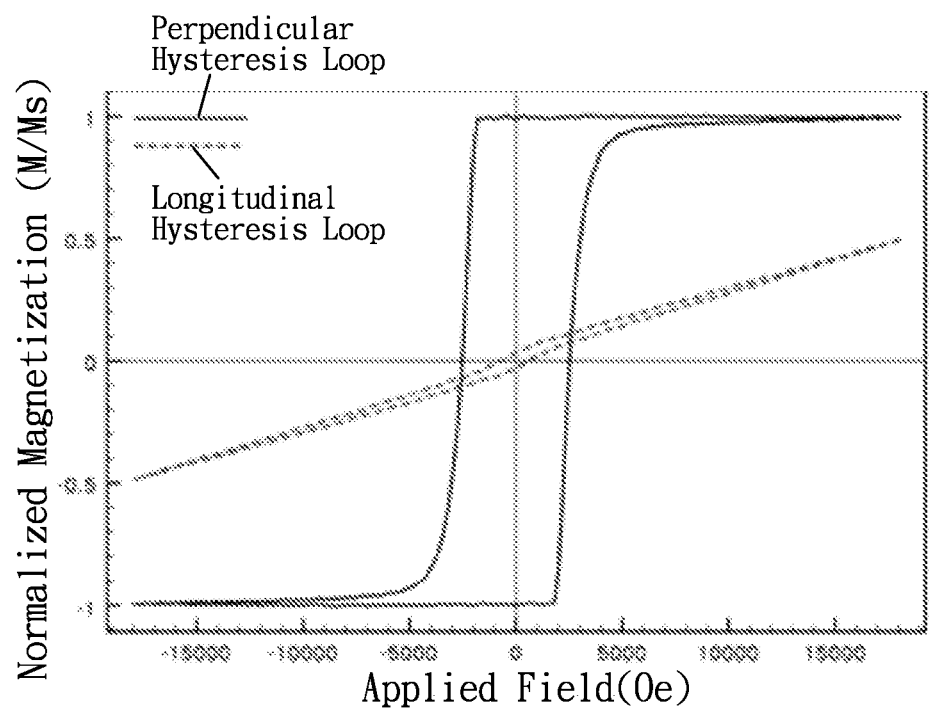
FIG. 8 is a hysteresis loop graph for the FePt magnetic layer of CE1.
Figure 9:
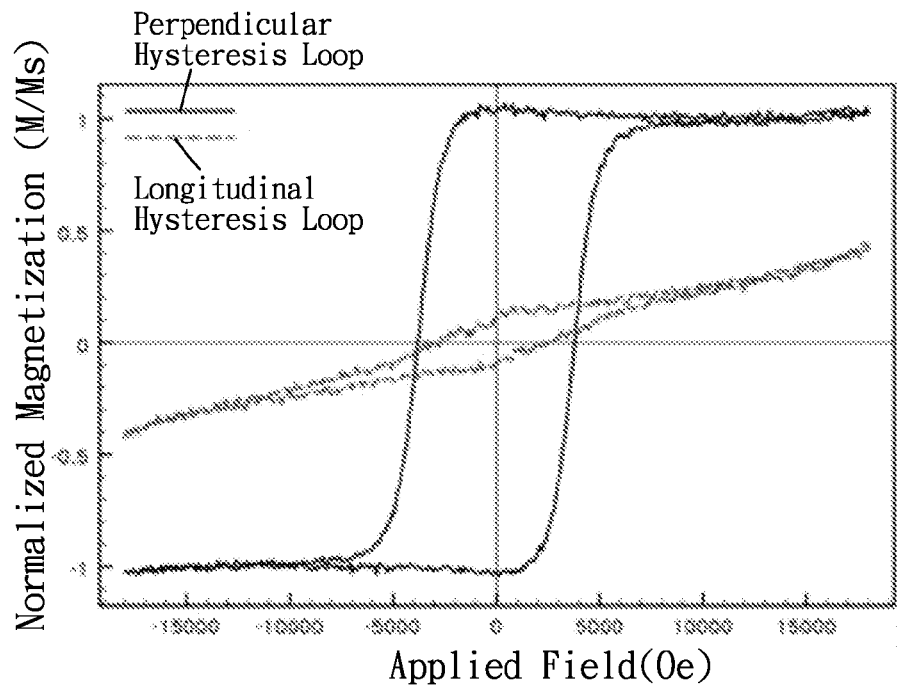
FIG. 9 is a hysteresis loop graph for the FeMnPt magnetic recording layer of E1.

FIGS. 8 and 9 show hysteresis loop graphs for CE1 and E1. It is seen from FIG. 8 that the out-of-plane coercivity (Hcl) of CE1 is about 2500 Oe. Further, it is seen from FIG. 9 that the out-of-plane coercivity of E1 is increased to 3700 Oe. This proves that the out-of-plane coercivity of E1 is increased due to the addition of the Mn atoms, thereby increasing the thermal stability of the FeMnPt alloy magnetic recording layer of E1. In addition, the longitudinal and perpendicular hysteresis loops of E1 do not overlap and define a narrowed elongated diamond shape. This proves that the magnetic recording medium of E1 has excellent out-of-plane coercivity.

Figure 10:
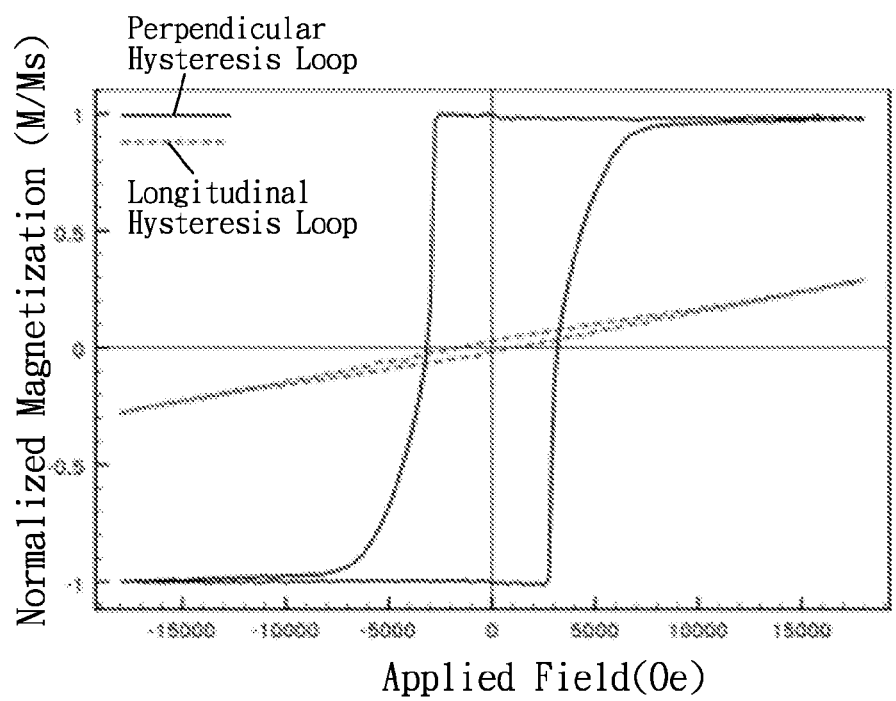
FIG. 10 is a hysteresis loop graph for the FePt magnetic layer of CE2.
Figure 11:
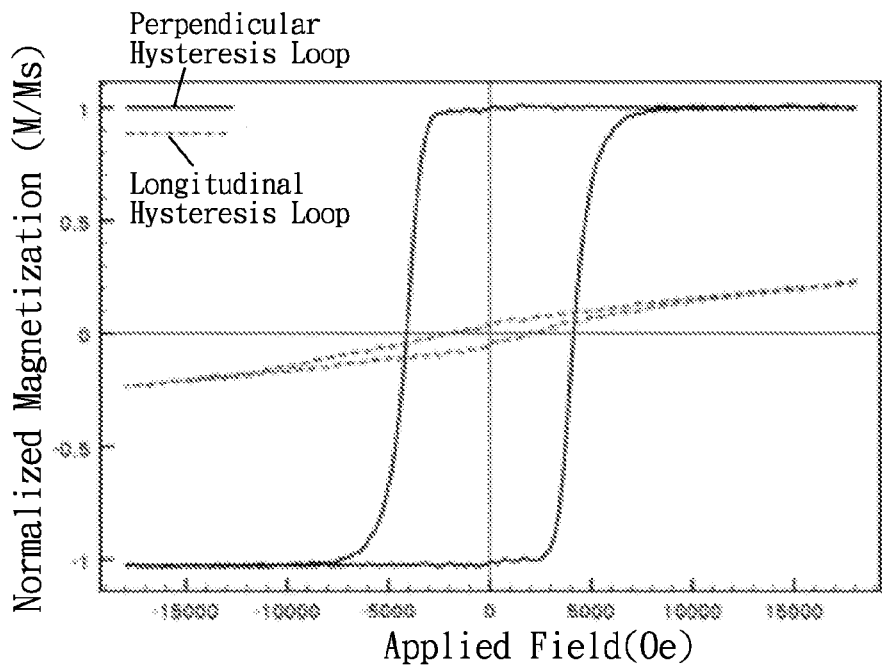
FIG. 11 is a hysteresis loop graph for the FeMnPt magnetic recording layer of E2.

FIGS. 10 and 11 show hysteresis loop graphs for CE2 and E2. It is seen from FIGS. 10 and 11 that the out-of-plane coercivity of CE2 is about 3300 Oe, and about 4200 Oe for E2. This proves that the out-of-plane coercivity of E2 is increased due to the addition of the Mn atoms, thereby increasing the thermal stability of the FeMnPt magnetic recording layer of E2. In addition, the longitudinal and perpendicular hysteresis loops of E2 do not overlap and define a narrowed elongated diamond shape. This proves that the magnetic recording medium of E2 has excellent out-of-plane coercivity.

Figure 12:
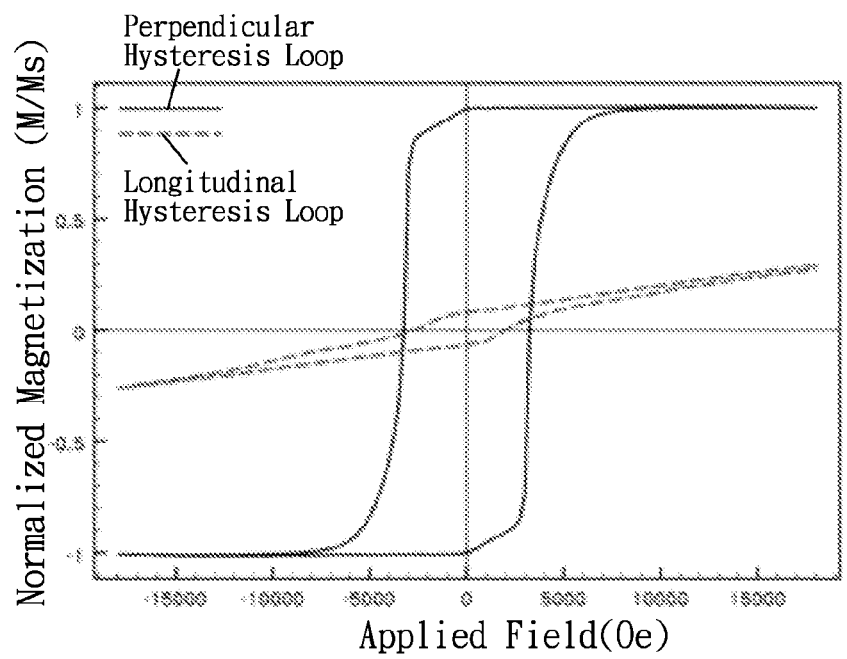
FIG. 12 is a hysteresis loop graph for the FeMnPt magnetic recording layer of E3.

FIG. 12 shows a hysteresis loop graph for E3. It is seen from FIG. 12 that the out-of-plane coercivity of E3 is about 3250 Oe. In addition, the longitudinal and perpendicular hysteresis loops of E3 do not overlap and define a narrowed elongated diamond shape. This proves that E3 has an excellent out-of-plane coercivity. Further, when E3 of the present invention is applied with a magnetic field in a reverse direction (i.e., when the applied magnetic field equals to zero and increases in the negative direction, i.e., negative value), the magnetization of the perpendicular hysteresis loop of E3 will be reduced, indicating the magnetic moment of the bottom surface 41 with soft magnetic property in E3 begins to switch. In addition, when the applied magnetic field is increased to about −3000 Oe, the magnetization of the perpendicular hysteresis loop of E3 begins to decrease exponentially, indicating the magnetic moment of the upper surface 42 with hard magnetic property also begins to switch. This proves that the bottom surface 41 with soft magnetic property of the FeMnPt alloy magnetic recording layer can facilitate the switching of the magnetic moment of the upper surface 42 with hard magnetic property, thereby reducing the writing field.

The FeMnPt magnetic recording layer 4 of the present invention has a $L1_0$ phase with (001) preferential orientation. This proves that it has an excellent perpendicular anisotropy. In addition, the out-of-plane coercivity of the FeMnPt magnetic recording layer 4 is increased due to the addition of the Mn atoms, thereby increasing the thermal stability. Further, the atomic concentration of Mn in the FeMnPt magnetic recording layer 4 is gradually increased from the upper surface 42 to the bottom surface 41, causing the upper surface 42 and the lower surface 41 to present a hard magnetic property and a soft magnetic property respectively, thereby facilitating the reduction of the writing field. In addition, a more sensitive signal can be obtained due to the reduction of the distance between the magnetic head and the upper surface 42 with hard magnetic property. Besides, since the magnetic recording medium can be made at the annealing temperature of 500° C. to 550° C., the method for making the magnetic recording medium of this invention can be advantageously incorporated into a semiconductor manufacturing process.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A magnetic recording medium, comprising:
a substrate; and
a magnetic recording layer that is made from a material having the chemical formula of $Fe_xMn_yPt_z$, that is formed above said substrate, and that has a bottom surface adjacent to said substrate and an upper surface away from said substrate;
wherein x, y, and z indicate average atomic concentrations for Fe, Mn, and Pt in said magnetic recording layer, and x+y+z is 100, x and y being greater than 0 and not greater than 65, z being in the range from 35 to 60,
wherein atomic concentration of Fe is gradually decreased from said upper surface to said bottom surface, and atomic concentration of Mn is gradually increased from said upper surface to said bottom surface so that the ferromagnetic property of said magnetic recording layer is gradually reduced from said upper surface to said bottom surface, and
wherein x and y are in the range from 10 to 45, z being in the range from 45 to 55.

2. A magnetic recording medium, comprising:
a substrate; and
a magnetic recording layer that is made from a material having the chemical formula of $Fe_xMn_yPt_z$, that is formed above said substrate, and that has a bottom surface adjacent to said substrate and an upper surface away from said substrate;
wherein x, y, and z indicate average atomic concentrations for Fe, Mn, and Pt in said magnetic recording layer, and x+y+z is 100, x and y being greater than 0 and not greater than 65, z being in the range from 35 to 60,
wherein atomic concentration of Fe is gradually decreased from said upper surface to said bottom surface, and atomic concentration of Mn is gradually increased from said upper surface to said bottom surface so that the ferromagnetic property of said magnetic recording layer is gradually reduced from said upper surface to said bottom surface, and
wherein said substrate is a MgO (001) substrate, and said magnetic recording layer has a face-centered-tetragonal (fct) structure.

3. The magnetic recording medium of claim 2, wherein said face-centered-tetragonal (fct) structure has preferential orientation to the (001) plane.

* * * * *